March 26, 1929.  L. J. BLACK  1,707,072
FISHING TOOL FOR OIL WELLS
Filed June 25, 1927  2 Sheets-Sheet 1
Fig. 1.
Fig. 2.
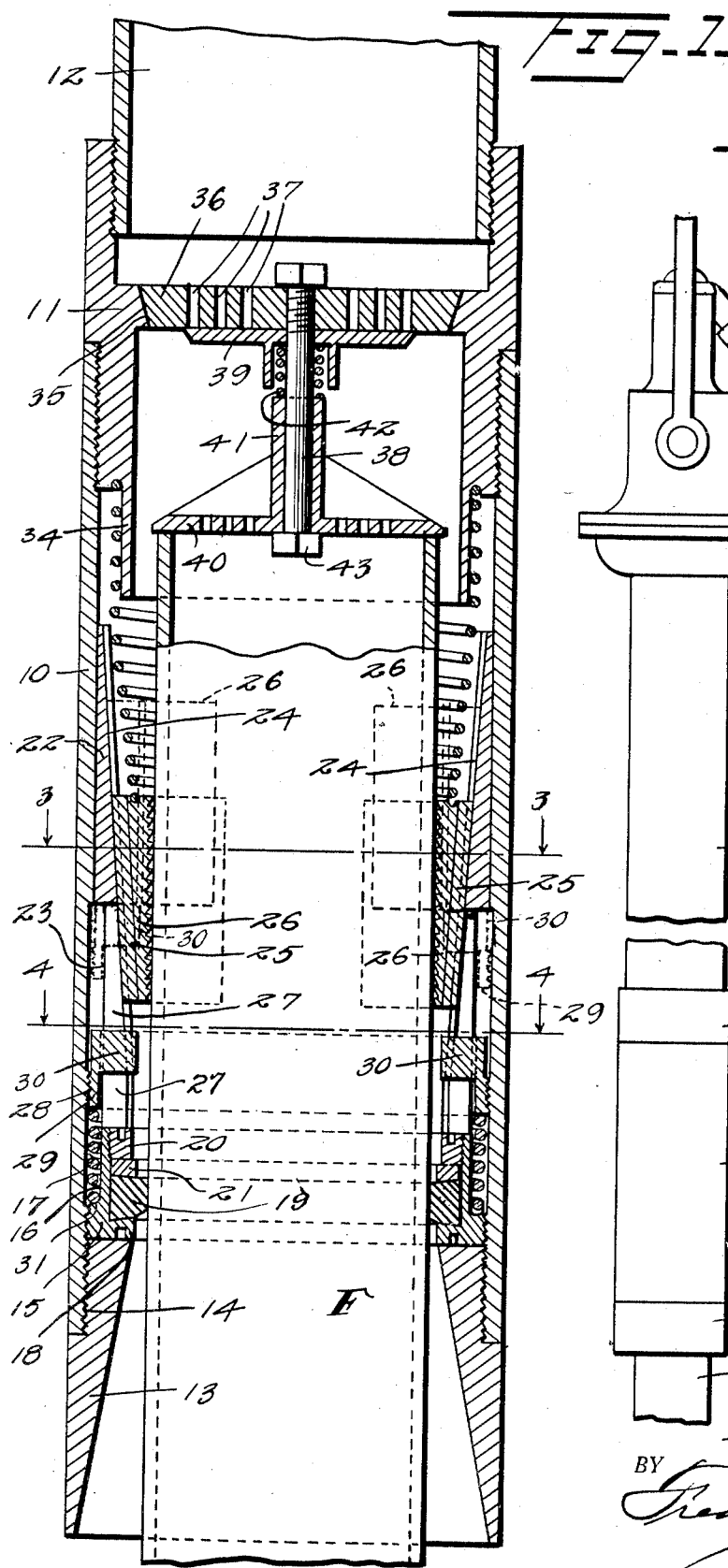
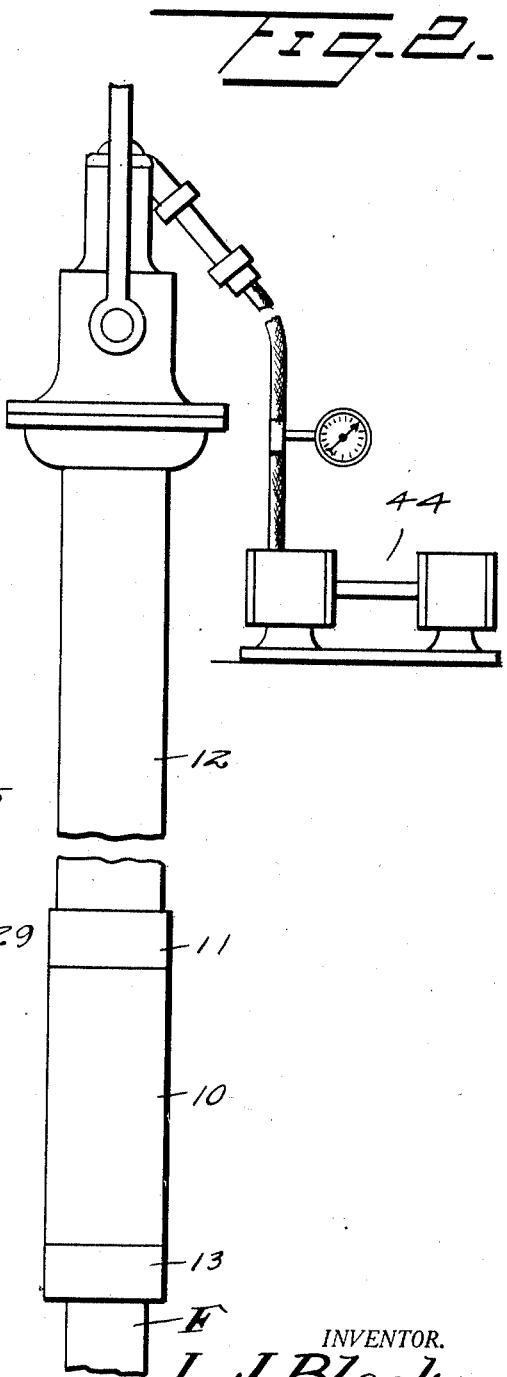
INVENTOR.
L. J. Black
BY
Frederick S. Still,
ATTORNEY.

March 26, 1929.   L. J. BLACK   1,707,072
FISHING TOOL FOR OIL WELLS
Filed June 25, 1927   2 Sheets-Sheet 2
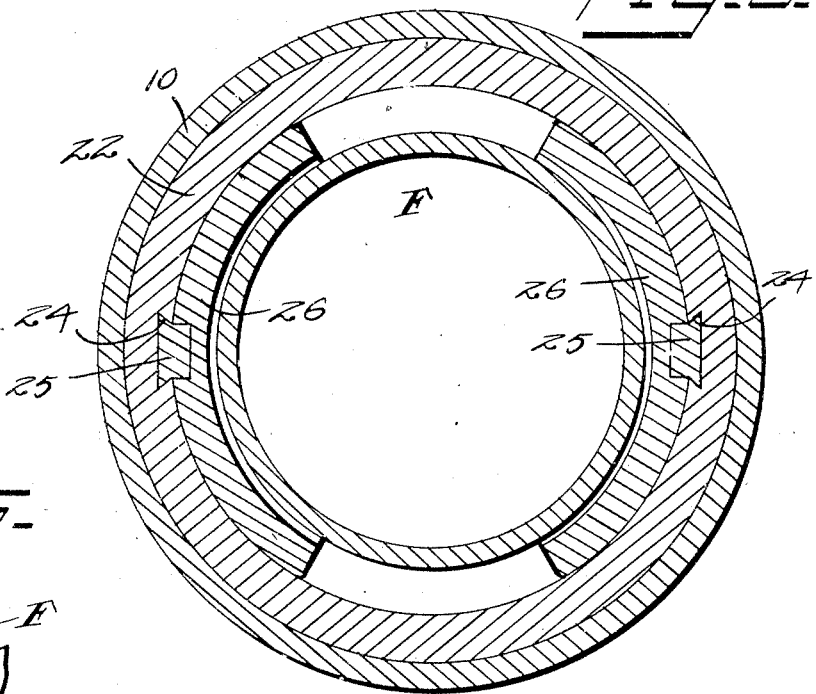
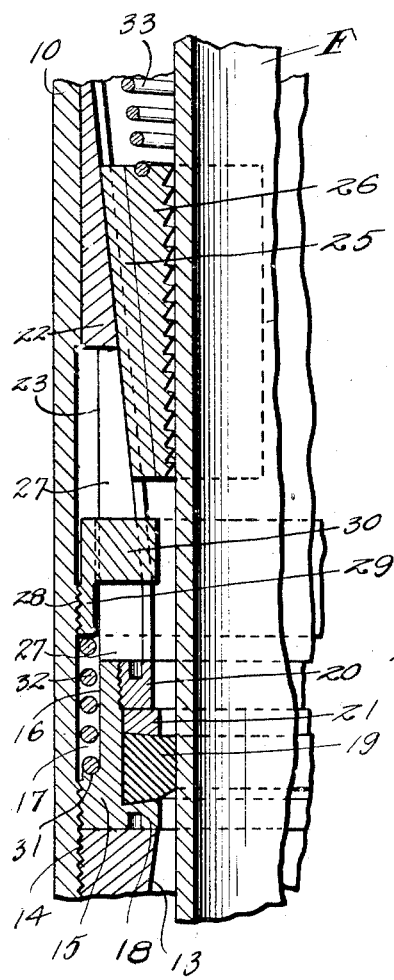
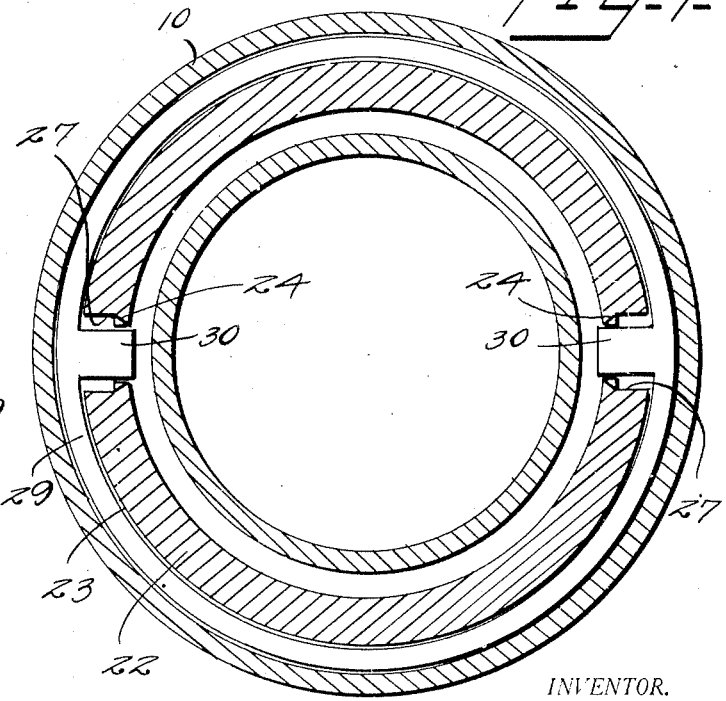
INVENTOR.
L. J. Black
BY
ATTORNEY.

Patented Mar. 26, 1929.

1,707,072

UNITED STATES PATENT OFFICE.

LEE J. BLACK, OF BEAUMONT, TEXAS.

FISHING TOOL FOR OIL WELLS.

Application filed June 25, 1927. Serial No. 201,482.

This invention relates to fishing tools for oil wells and more particularly to a device for removing from well bottoms broken portions of drill pipe and the like.

An important object of the invention is to produce a device of this character having readily operable means through which a grip taken upon the pipe may be released in event it is found that the gripped pipe cannot be removed.

A further object of the invention is the provision of a device of this character including means for packing to the pipe so that the circulation of water therethrough to assist in releasing the pipe may be established.

A still further object of the invention is the production of a device of this character including means for giving a positive indication of the fact that the fish being sought is so located that it may be gripped.

A further object of the invention is to provide a construction such that these three features may be readily combined in a single overshot and a structure produced which will be durable and efficient in service and a general improvement in the art.

These and other objects I attain by the construction shown in the accompanying drawings, wherein for the purpose of illustration is shown a preferred embodiment of my invention and wherein:—

Figure 1 is a vertical sectional view through a fishing tool constructed in accordance with my invention;

Figure 2 is a side elevation partially diagrammatic showing the connections with the pump employed to provide an indication that the fish is so positioned that it may be grasped by the fishing tool;

Figure 3 is an enlarged section on the line 3—3 of Figure 1;

Figure 4 is a section on the line 4—4 of Figure 1;

Figure 5 is an enlarged detail sectional view showing the slip mountings and the control member therefor.

Referring now more particularly to the drawings, the numeral 10 generally designates the bowl of the overshot, 11 a coupling by means of which the bowl may be connected to the drilling string 12 and 13 a guide shoe engaged with threads 14 formed upon the interior of the lower end of the bowl and guiding the article being fished for into the interior thereof.

In accordance with my invention, I provide a ring 15 exteriorly threaded for engagement with the threads 14 at the lower end of the bowl and having its upper end exteriorly relieved, as at 16, so that in the applied position it combines with the inner wall of the bowl to provide an annular channel 17. The exterior face of the ring at its lower end is provided with an outwardly extending flange 18 producing an upwardly facing shoulder against which is seated the lower face of a rubber packing ring 19. The upper end of the inner face of the ring is threaded for the reception of a nut 20 through which a junk ring 21 abuts the upper face of the packing element 19. The shoe 13 acts as a lock nut for the ring 15.

Rotatably mounted in the bore of the bowl is a sleeve 22, the lower end of which rests upon the upper end of the ring 15 or the nut 20 carried thereby or both. This lower end of the sleeve is exteriorly relieved at 23 and combines with the inner wall of the bowl to produce a continuation of the channel 17. The bore of the sleeve 22 tapers downwardly and is provided with dove-tail channels 24 slidably receiving T's 25 carried by slips 26. The relieved portion of the sleeve is provided in alignment with the channels 24 with slots 27 opening through the lower end thereof.

The interior wall of the bowl is provided with inwardly extending threads 28 intermediate the ends of the channel 17 and a releasing ring 29 is threaded thereon. This releasing ring has lugs 30 entering the slots 27 and will accordingly be rotated when the sleeve 22 is rotated. These lugs are of sufficient size that they will engage the keys of the slips 26 when the releasing ring is moved upwardly. Between the lower end of the releasing ring and the shoulder 31 formed at the lower end of the relief of the ring 15, a spring 32 extends and is normally tensioned. When, by rotation of the sleeve 22, the ring 29 is released from the threads 28, this spring will force it upwardly and exert an upward thrust against the slips. It will be quite obvious that if the slips, when they receive this thrust, are but loosely engaged with the surface of the fish F, they will be forced upwardly and are brought to an inoperative position shown in dotted lines in Figure 1. The slips 26 are normally forced downwardly by a second spring 33 which is much lighter than the spring 32 and accordingly yields when the spring 32 comes into action. This spring seats at its lower end upon the slips and at its upper end upon the lower end of the coupling 11. The coupling 11 is preferably provided with a depending skirt 34 partially housing and protecting the spring 33.

The coupling 11 is formed interiorly with a downwardly tapering seat 35 upon which is seated a disk 36 having perforations 37. Secured to the disk and depending therefrom is a stem 38 and surrounding this stem is a valve 39 for which the disk 36 forms a seat. A perforated disk 40 of less diameter than the opening at the seat 35 is slidably mounted upon the lower end of the stem 38 and has a guiding hub 41 embracing this stem. Between the hub 41 and the adjacent face of the valve 39, a spring 42 extends. It will be obvious that since downward movement of the disk 40 upon the stem is limited by a stop 43, this spring will serve to keep the valve 39 closed and accordingly to resist the passage of water therethrough with its tension. It will also be obvious that if the disk 40 is forced upwardly against the stem, the tension of the spring 42 will be increased and accordingly the pressure at which the water may open the valve 39 will likewise be increased.

In the use of the device, the assemblage is secured to the lower end of a drill pipe and this drill pipe placed in communication with a source of fluid under pressure, such as the ordinary slush pump, generally designated at 44. As the fish enters the lower end of the fishing tool, it will be guided through the rubber ring 19 which, by its engagement with the wall of the fish, will provide a seal between the fish and fishing tool. The upper end of the fish continuing upwardly through the slips engages the disk 40 and elevates the same, increasing the tension of the spring 42 and accordingly increasing the pressure which must be generated at the pump 44 to force water through the apertures 37. An indication is thus given to the operator who permits the string to suddenly drop for a short distance. During this drop, the guiding hub 41 of the disk 40 will solidly engage against the valve 39 and through this valve with the disk 36, unseating the same and removing the resistance to the passage of fluid. The fishing string is then elevated and the slips grip the walls of the fish. After a proper grip is taken, if an upward pull fails to dislodge the fish and it is found that it is impossible to wash the fish loose, by pumping water therethrough, the string is rotated. Since the slips 26 are at this time in engagement with the wall of the pipe, they provide resistance to this rotation and accordingly the sleeve 22 will not be rotated and will hold against movement the ring 29. As soon as the rotation has been carried to a point sufficient to disengage the ring 29 from its threads, the fishing tool may be slightly lowered, releasing the grip of the slips from the pipe and the spring 32 will then act to force the ring 29 upwardly, carrying the slips before it and moving them to their inoperative positions so that when the fishing string is again elevated, they will not grip the pipe.

It will be obvious that the construction hereinbefore set forth is capable of a certain range of change and modification without materially departing from the spirit of the invention and I accordingly do not limit myself to such specific structure except as hereinafter claimed.

I claim:—

1. In combination with a drilling string, a fishing tool including gripping elements carried by the lower end thereof, a pump for discharging water through the string and fishing tool, packing carried by the lower end of the fishing tool and engaging a fish entering the tool to seal the fish thereto and divert the water discharged through the string to said fish and means engaged by a fish when said fish is positioned for engagement by the gripping elements of the fishing tool for varying the pressure required to discharge water through the string and fish.

2. In combination with a drilling string, a fishing tool including gripping elements carried by the lower end thereof, a pump for discharging water through the string and fishing tool, packing carried by the lower end of the fishing tool and engaging a fish entering the tool to seal the fish thereto and divert the water discharged through the string to said fish, a valve yieldably resisting discharge of the water through the string and fishing tool by the pump and means engaged by the fish when said fish is positioned for engagement by the gripping elements of the fishing tool for increasing the resistance of said valve to the discharge of water.

3. In combination with a drilling string, a fishing tool including gripping elements carried by the lower end thereof, a pump for discharging water through the string and fishing tool, a valve yieldably resisting discharge of the water through the string and fishing tool by the pump, means engaged by a fish when said fish is positioned for engagement by the gripping elements of the fishing tool for increasing the resistance of said valve to the discharge of water, and a seat for said valve displaceable upon a predetermined operation of the string with a fish so positioned, to a position where it will not interfere with the discharge of water through the string and fishing tool.

4. In a fishing tool for deep wells, a barrel, gripping elements supported thereby and movable from gripping to inoperative positions and normally disposed in the gripping position, said gripping elements being rotatable with relation to the barrel and normally inoperative spring operated means released by relative rotation of the gripping means and barrel for moving said gripping means to inoperative position.

5. In a fishing tool, a barrel, a sleeve rotatable in the barrel, slips held against rotation with relation to but capable of vertical movement upon the sleeve and having gripping teeth for engagement with a fish entered therebetween and means operated by relative rotation of the sleeve and barrel for urging said slips upwardly in the sleeve to a position where they are held against engagement with the fish.

6. In a fishing tool, a barrel, a sleeve rotatable in the barrel, slips held against rotation with relation to but capable of vertical movement upon the sleeve and having gripping teeth for engagement with a fish entered therebetween and a spring-pressed ring having portions for engaging the slips held against rotation with relation to the sleeve and having threaded engagement with the barrel.

7. In a fishing tool, a barrel, a sleeve rotatable therein and having its inner face formed as a downwardly tapering slip seat, slips keyed to the sleeve and having at their inner faces gripping teeth for engagement with a fish, the lower end of the sleeve being exteriorly relieved and combining with the opposed wall of the barrel to provide an annular chamber, the barrel formed wall of the chamber having a short threaded section, a ring engaged with said threaded section, a spring urging said ring upwardly and lugs carried by said ring extending through slots formed in the lower end of the sleeve for engagement with said slips.

8. In a fishing tool, a barrel, a sleeve rotatable therein and having its inner face formed as a downwardly tapering slip seat, slips keyed to the sleeve and having at their inner faces gripping teeth for engagement with a fish, the lower end of the sleeve being exteriorly relieved and combining with the opposed wall of the barrel to provide an annular chamber, the barrel formed wall of the chamber having a short threaded section, a ring engaged with said threaded section, a spring urging said ring upwardly, lugs carried by said ring extending through slots formed in the lower end of the sleeve for engagement with said slips, said spring engaging the ring with its upper end and a packing ring against which the lower end of the spring is seated, said packing ring including packing elements for engagement with a fish to seal the space between the barrel and fish against the passage of fluids.

9. In a fishing tool, a barrel, a sleeve rotatable therein and having its inner end formed as a downwardly tapering slip seat, slips keyed to the sleeve and having at their inner faces gripping teeth for engagement with a fish, the lower end of the sleeve being exteriorly relieved and combining with the opposed wall of the barrel to provide an annular chamber, the barrel formed wall of the chamber having a short threaded section, a ring engaged with said threaded section, a spring urging said ring upwardly, lugs carried by said ring extending through slots formed in the lower end of the sleeve for engagment with said slips, said spring engaging the ring with its upper end and a packing ring against which the lower end of the spring is seated, said packing ring including packing elements for engagement with a fish to seal the space between the barrel and fish against the passage of fluids, the upper end of the packing ring affording a seat for the sleeve.

10. In a fishing tool for deep wells, a barrel, gripping elements supported thereby and movable from gripping to inoperative positions and normally disposed in the gripping position, said gripping elements being rotatable with relation to the barrel and normally inoperative means released by relative rotation of the gripping means and barrel for moving said gripping means to inoperative position, said releasing means comprising a ring threaded to the barrel and held against rotation with relation to the gripping means and a spring urging the ring in engagement with the slips to move the same to inoperative position when the threaded engagement between the barrel and ring is disengaged.

11. A device as set forth in claim 2, wherein said valve and the seat therefor are displaceable by the fish upon a predetermined operation of the string when the fish is engaged in the fishing tool to thereby prevent interference with the discharge of water by the valve.

In testimony whereof I affix my signature.

LEE J. BLACK.